Nov. 12, 1929.　　　L. H. HANDY　　　1,735,244
FLUSH VALVE
Filed May 31, 1927
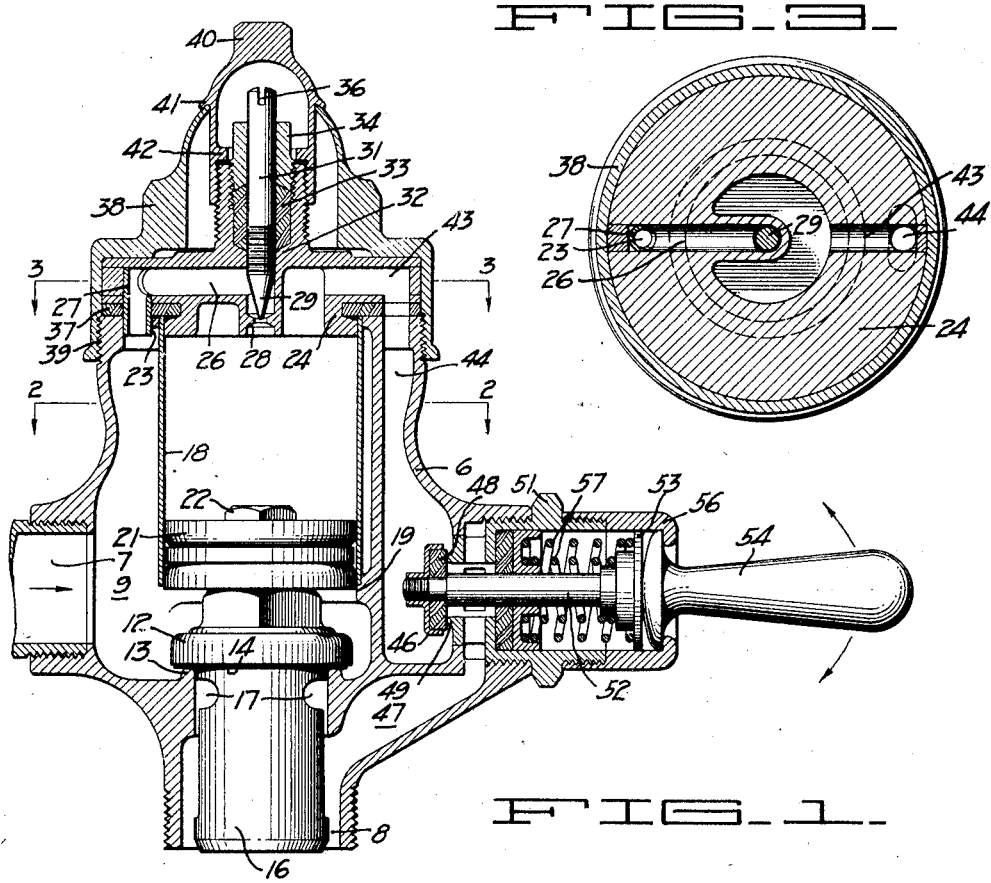
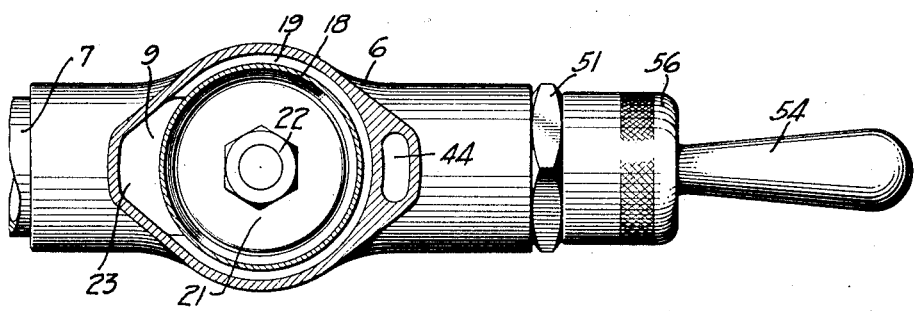
INVENTOR
Lucien H. Handy
BY
White, Prost & Fryer
his ATTORNEYS Patented Nov. 12, 1929

1,735,244

UNITED STATES PATENT OFFICE

LUCIEN H. HANDY, OF OAKLAND, CALIFORNIA, ASSIGNOR TO HANDY SELF-CLEANING FLUSH VALVE CO., OF SAN FRANCISCO, CALIFORNIA, A CORPORATION OF DELAWARE

FLUSH VALVE

Application filed May 31, 1927. Serial No. 195,162.

My invention relates to valves for controlling hydraulic flow and particularly to valves which afford a hydraulic flow having a selective duration.

An object of my invention is to provide a hydraulic flush valve in which the duration of flush can be regulated without interrupting the supply of water.

Another object of my invention is to provide a flush valve in which the length of time of flush can be regulated from the exterior of the valve.

An additional object of my invention is to provide a flush valve in which there is no leakage of water to the exterior of the valve.

My invention possesses other advantageous features, some of which with the foregoing, will be set forth at length in the following description where I shall outline in full that form of the flush valve of my invention which I have selected for illustration in the drawings accompanying and forming part of the present specification. In said drawings I have shown one form of flush valve embodying my invention, but it is to be understood that I do not limit myself to such form since the invention as set forth in the claims may be embodied in a plurality of forms.

In the drawings:

Fig. 1 is a cross section thru the assembled flush valve of my invention.

Fig. 2 is a section thru the valve of my invention, the plane of section being indicated by line 2—2 of Fig. 1.

Fig. 3 is also a section thru the valve of my invention, the plane of section being indicated by line 3—3 of Fig. 1.

The preferred embodiment of my invention preferably comprises a flush valve in which the duration of flush is regulated by the influx of water to a chamber and in which the rate of influx of water to the chamber is variable from the exterior of the valve without interrupting its operation.

In the modification of my invention disclosed in the accompanying drawings, a valve body 6 is located in a hydraulic circuit by an inlet 7 and an outlet 8. The valve body is generally a hollow metal casting and includes a valve chamber 9 leading from inlet 7 to the outlet 8. Controlling hydraulic flow between valve chamber 9 and the outlet 8 is a valve 12 which normally is seated on a valve seat 13 forming part of the valve body 6. The valve 12 usually comprises a disc having a sealing material 14 on the seating face thereof and includes a depending guide collar 16 running in the outlet 8. The collar is preferably hollow and is provided with apertures 17 through which water can flow to the interior of the collar when the valve is open to facilitate the discharge of water from the valve chamber 9.

To control the length of time that the valve 12 is open to effect a flush, I have provided mechanism for closing the valve after any selected interval. This mechanism generally includes a cylinder 18 seated on a shoulder 19 in the valve body and in which a piston 21 reciprocates. The piston preferably comprises the usual leather cups and is secured to the valve 12 by a through bolt 22. Movement of the piston 21 in the cylinder 18 correspondingly actuates the valve 12 to permit or restrict the flow of water through the valve body. Water is admitted to the interior of the cylinder and acts on the upper side of piston 21 so that the resultant downward pressure maintains the valve 12 firmly seated and prevents leakage. This is the normal position of the piston and valve.

The water admitted to the interior of the cylinder preferably passes from the valve chamber 9 through an aperture 23 in the upper portion of the valve body 6. A cap 24 is seated on the valve body and is provided with a conduit 26 communicating with the aperture 23 and also with the interior of cylinder 18. To position the cap 24 on the valve body with the aperture 23 in registry with conduit 26 to insure a flow of water, a nipple 27 is inserted in the cap and projects through the aperture 23 into the valve chamber 9. A channel is thereby provided for the flow of water from the valve chamber 9 into the interior of cylinder 18.

The rate at which water passes through conduit 26 into the interior of cylinder 18 controls the duration of flush and I therefore provide a rate regulating means comprising a needle valve seat 28 in the discharge portion of conduit 26. A needle valve 29 cooperates with seat 28 and has a projecting stem 31 threaded into a boss 32 forming a portion of cap 24. Packing 33 surrounds the stem of the needle valve and is compressed into place by a packing nut 34. The upper end of stem 31 is provided with a slot 36 for the reception of a tool to revolve the needle valve and adjust its spacing from the needle valve seat 28 and in that manner to regulate the rate of flow of water from the inlet 7 through the valve chamber 9 into the interior of cylinder 18.

To prevent leakage between valve body 6 and cap 24, a suitably perforated gasket 37 is inserted between the valve body and the cap and the entire assembly is retained in position by a hood 38 engaging screw threads 39 on the valve body bearing firmly against the cap. Preferably the hood 38 is apertured to permit the projection of the needle valve stem 31 and to preclude the possibility of any water reaching the exterior of the flush valve, I have provided in addition to the packing 33 a closure 40. This is a continuous cylindrical body screwed onto the threaded exterior of boss 32 and is provided with annular flanges 41 and 42 tightly sealing the boss 32 against leakage as well as the apertured portion of hood 38. Leakage from the flush valve is thereby prevented while the adjustment 36 is easily reached by simply unscrewing the closure 40.

The excess pressure existing normally on the upper side of piston 21 is relieved and the valve 12 is opened by a manually operated valve for releasing water from the interior of cylinder 18 faster than it can enter through conduit 26. The pressure on the lower side of the piston then opens valve 12 to effect a flush. A passage 43 is formed in cap 24 and communicates with the interior of cylinder 18 and also with a separate chamber 44 formed in the side of the valve body 6. A relief valve 46 is interposed between chamber 44 and a passage 47 opening into the outlet 8.

The relief valve includes a packing washer 48 resting on a valve seat 49 forming a portion of a relief valve body 51 screwed into the main valve body 6. The washer 48 is retained on a stem 52 slidably mounted in body 51 and having an enlarged head 53 at its outer end. A manually operable handle 54 is confined adjacent the head 53 by a sleeve 56 engaging the body 51 and upon oscillation of the handle, the head 53 and stem 52 are axially translated against the force of springs 57. The valve 48 is lifted from its seat and permits water to flow thru chamber 44 and passage 47 into the outlet 8 wherein the pressure is approximately atmospheric. Immediately the valve 48 is lifted from its seat, the pressure on the bottom of piston 21 lifts the piston within the cylinder 18 and forces the contained water into the outlet. The restriction afforded by needle valve 29 in conduit 26 permits only a slow ingress of water to the interior of cylinder 18 so that the rapid escape of water allows the piston to move readily to the top thereof.

When the handle 54 is released and valve 46 is returned to its seat by springs 57, the discharge of water from the interior of cylinder 18 is stopped. The slow influx through conduit 26 then gradually fills the cylinder and forces the piston 21 downwardly seating valve 12 and cutting off the flow from inlet conduit 7 to outlet conduit 8 thereby stopping the flush. With the interior of cylinder 18 again filled, the resultant downward pressure on the piston 21 seats valve 12 firmly until a subsequent manipulation of handle 54. The adjustment of needle valve 29 directly controls the duration of flush as it regulates the time required by the water flowing through conduit 26 to return the piston 21 to its lowermost position. To vary the duration of flush, it is necessary only to remove the closure 40 and revolve the needle valve 29 to vary the size of the restriction in conduit 26 so that the rate of influx of water to the cylinder 18 will be varied. This can easily be accomplished without turning off the supply of water or interrupting in any manner the functioning of the valve.

I claim:

1. A flush valve comprising a valve body, a valve therein, a piston connected to said valve, a cylinder in which said piston operates, a cap closing said cylinder, means in said cap for regulating the flow of water to said cylinder, and an apertured hood for retaining said cap in position, the aperture in said hood affording access to said regulating means.

2. A flush valve comprising a valve body, a cylinder in said valve body, a cap closing one end of said cylinder, said cap having a conduit therein communicating with said cylinder, a boss on said cap, a needle valve controlling said conduit, a stem on said needle valve passing through said boss, a hood for retaining said cap on said valve body and having an aperture through which said stem projects, and a closure engaging said boss for sealing said aperture.

3. A flush valve comprising a valve body having a passage therein, a cylinder in said valve body, a cap closing one end of said cylinder, said cap having a conduit therein communicating at one end with said cylinder, a nipple in the other end of said conduit projecting into said passage, a needle valve controlling said conduit, a stem on said needle valve, a boss on said cap through which said stem passes, a packing nut seated on said boss and surrounding said stem, a hood screwed to said valve body and retaining said cap in position, and a closure overlying said stem and said packing nut screwed to said boss and seated on said hood.

In testimony whereof, I have hereunto set my hand.

LUCIEN H. HANDY.